United States Patent [19]

Schmidt

[11] Patent Number: 5,722,171

[45] Date of Patent: Mar. 3, 1998

[54] SCISSORS, PARTICULARY HAIRDRESSER'S SCISSORS

[76] Inventor: Hardi Schmidt, Nummener Street 70, Solingen, Germany, 42653

[21] Appl. No.: 637,767

[22] PCT Filed: Oct. 22, 1994

[86] PCT No.: PCT/DE94/01247

§ 371 Date: May 2, 1996

§ 102(e) Date: May 2, 1996

[87] PCT Pub. No.: WO95/13168

PCT Pub. Date: May 18, 1995

[30] Foreign Application Priority Data

Nov. 9, 1993 [DE] Germany ............ 43 38 235.5
Jul. 2, 1994 [DE] Germany ............ 44 23 320.5

[51] Int. Cl.$^6$ ................................. B26B 13/12
[52] U.S. Cl. ...................... 30/255; 30/256; 30/260; 30/341
[58] Field of Search ................ 30/254, 255, 256, 30/232, 260, 340, 341; 81/177.8, 177.7, 427.5

[56] References Cited

U.S. PATENT DOCUMENTS 2,758,372  8/1956  Gammons ............... 30/260
3,906,630  9/1975  Megna ................... 30/260
5,109,608  5/1992  Pracht ................... 30/341

FOREIGN PATENT DOCUMENTS

| 3928859 | 3/1991 | Germany | 30/341 |
| 188993 | 4/1964 | Sweden | 30/341 |
| 17248 | of 1895 | United Kingdom | 30/255 |
| 426695 | 4/1935 | United Kingdom | 30/260 |
| 2014502 | 8/1979 | United Kingdom | 30/256 |

*Primary Examiner*—Hwei-Siu Payer
*Attorney, Agent, or Firm*—Diller, Ramik & Wight, PC

[57] ABSTRACT

In scissors, particularly hairdresser's scissors, with two scissor blades (1, 2), connected to each other in articulated fashion by means of a single pivot (3), and two scissor handles (4, 5), each of which displays two handle sections (28, 29) and (30, 31), where the first handle section (28, 30) is connected to its corresponding scissor blade (1, 2) and the second handle section (29, 31) includes the end grip of the scissor handle (4 or 5), and where the two corresponding handle sections are connected to each other in articulated fashion to permit pivoting in the plane of the handle, it is envisaged that the two handle sections can be locked in various angular positions in relation to each other in order to allow optimum ergonomic setting, and that locking takes place in the articulated connection of the handle sections.

13 Claims, 9 Drawing Sheets

FIG.14
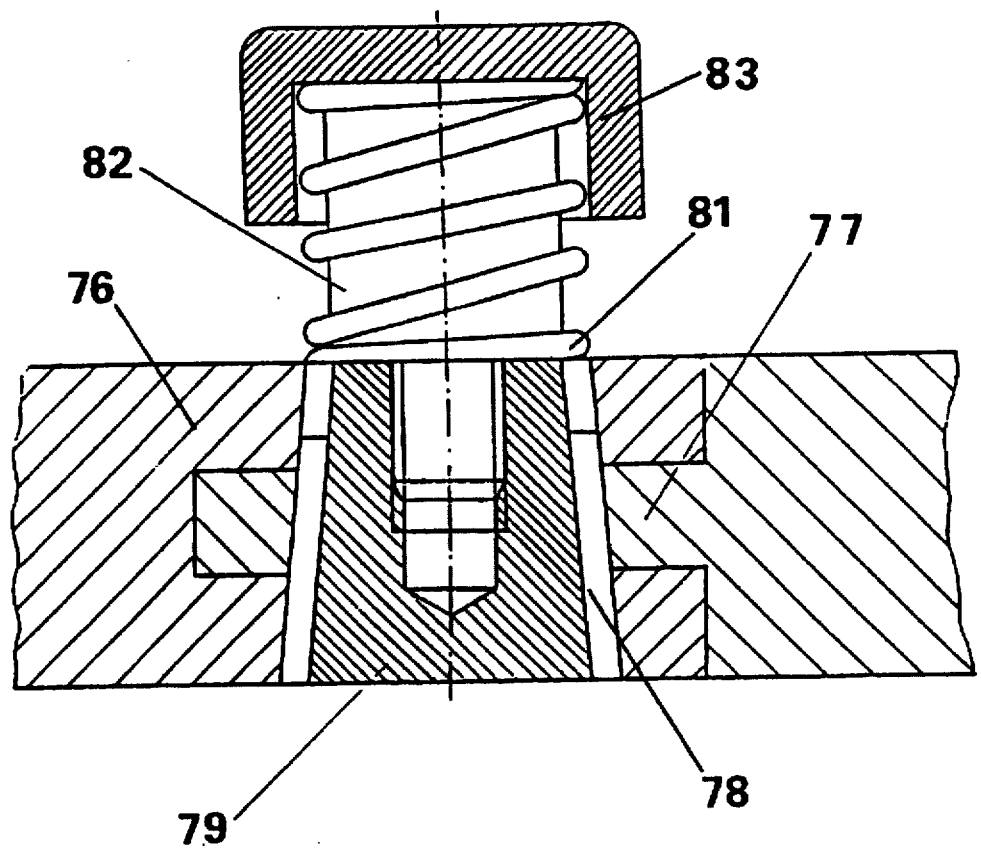
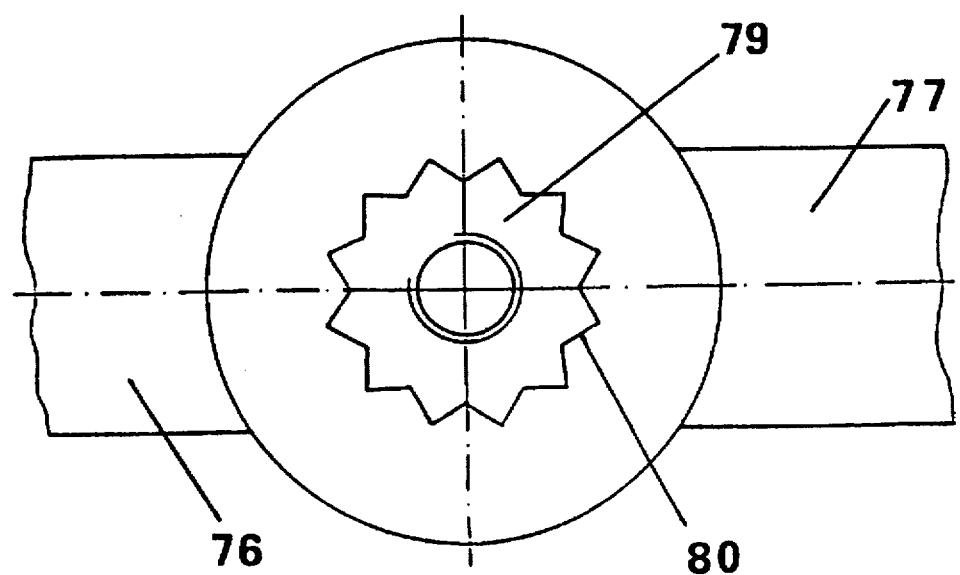
FIG.15

SCISSORS, PARTICULARY HAIRDRESSER'S SCISSORS

BACKGROUND OF THE INVENTION

The invention relates to scissors, particularly hairdresser's scissors, with two scissor blades connected to each other in articulated fashion by means of a single pivot, and two scissor handles, each of which displays two handle sections, where the first handle section is connected to its corresponding scissor blade and the second handle section includes the grip end of the neck of the scissors, and where the two corresponding handle sections are connected to each other in articulated fashion in the plane of the handle.

Scissors of this kind are known from DE-PS 74 279. The scissors described therein are scissors of folding design, where a spring provided on each second handle section fits into a notch provided on the respective first handle section, thus locking the two handle sections together.

Other scissors of the type mentioned at the beginning are described in FR 582 786.

Particularly in the case of scissors used frequently for work, such as hairdresser's scissors, it is desirable, for ergonomic reasons, to match the position of the handle loops in relation to the direction of the scissor blades and the distance between the handle loops to the respective anatomical and work-related conditions of the person using the scissors. Conventional hairdresser's scissors frequently lead to an unnatural posture of the arm or flexion of the hand. This can easily lead to cramps. As can be observed in practice, this is then compensated for by bending at the hips or knees. This typical hairdresser's working posture can, however, lead to impaired and damaged health, particularly in the long term, including damage to the spine.

Therefore, the task of the present invention is to create a pair of scissors, particularly hairdresser's scissors, which guarantee ergonomic adaptation to different anatomical conditions and working methods in practice.

SUMMARY OF THE INVENTION

According to the invention, the task is solved by the fact that the scissors are designed according to the type mentioned at the beginning, where the respective first and second handle sections can be locked in position at various angles in relation to each other, and are locked at the pivot connection of the handle sections.

On account of the design according to the invention, the angular position of the scissor handles in relation to the scissor blades can be set individually, so that the position of the handle loops in relation to the direction of the scissor blades and the distance between the handle loops can be matched ergonomically to the anatomical prerequisites and working method of the person using the scissors. In particular, the scissors can be set optimally for both right and left-handed users. Furthermore, they can be adjusted to match the size of the hand and fingers of the person using the scissors, in order to prevent cramps occurring in the muscles of the hand. Finally, the scissors according to the invention also allow a natural posture of the arm and/or flexion of the hand of the respective person when working.

Locking of the handle sections of a scissor handle over a certain range of angles is known from U.S. Pat. No. 919,211. In order to allow locking over a certain range of angles, the second handle section, which bears the handle loop for the thumb, displays an area which bulges out to the side and has a slit curved concentrically in relation to the pivot connecting the two handle sections. A locking screw located on the first handle section protrudes through this slit in order to lock the two handle sections in the desired angular position.

Angle setting on just one scissor handle and the device provided for locking the two handle sections are not suitable for solving the task in hand, particularly in the case of hairdresser's scissors. The bulging area can barely be designed in such a way that an accurate and constant stop is guaranteed at different angular settings of the second handle section, which is particularly necessary in the case of precision scissors in order to be able to close the scissors correctly without the scissor blades crossing each other. Hairs can also easily become lodged around the bulged area and in the slit. Furthermore, the pivotability of the second handle section is limited by the length of the slit. Finally, the pivoting device cannot be fitted on the second, longer handle section without any further ado. It would have an irritating effect if located on this handle section, which serves as a finger rest.

Other scissors in which the scissor handles are pivotable in relation to the scissor blades are known from DE-OS 26 49 157. In these scissors, the two scissor handles are arranged in pivotable fashion in relation to the scissor blades on a cam which passes through the opening of the pivot of the two scissor blades. To this end, the cam displays opposing projections arranged eccentrically on its face ends, which reach through bore holes in the two scissor handles. The face ends of the projections are provided with threaded bores which interlock with screws on both sides of the scissors, which lock the scissor handles and the scissor blades sandwiched between them against each other in non-positive fashion. A catch located on the side of one scissor handle, connected to the cam via one of the screws, allows the cam to be pivoted around the axis of the eccentric projections. The two scissor blades, which are mounted on the scissor handles towards the tip of the scissors by inward-facing projections of the scissor handles which engage slits in the scissor blades, are pivoted in relation to the scissor handles as a result.

On account of the design-induced mounting of the scissor blades about the cam, on which they are held together by the scissor handles arranged laterally above, and the mounting of the slits in the scissor blades on the projections of the scissor handles, it is impossible to achieve precise and stable mounting of the two scissor blades in relation to the two scissor handles. Because several parts are held together at the pivot of the scissors, this displays a relatively large amount of play. The play necessary for mounting the projections of the scissor handles in the slits of the scissor blades also contributes to the scissor blades being able to be moved in relation to each other with little effort, even when the scissor handles are held tight. Thus, the mounting and guidance of the scissor blades is neither precise nor stable in either the cutting plane or perpendicular thereto. Even if this disadvantage is of no major significance in the case of paper scissors or cloth scissors, it becomes all the more noticeable in the case of high-quality scissors. High-quality scissors, such as hairdresser's scissors, demand highly precise and stable guidance of the scissor blades with flawless closing pressure. The application of the principle familiar from the Japanese patent application to such scissors would thus not fulfil the quality standards.

Furthermore, it would be difficult, if not impossible, to apply the pivoting mechanism familiar from the Japanese patent application to slender, thin scissors, such as hairdresser's scissors. The reduction in size of the cam necessary to this end would be more likely to further impair the stability and precision of such scissors.

In a preferred embodiment of the invention, the two handle sections are connected to each other, and can be locked in place in relation to each other, by a screw-and-nut connection. All suitable types of such a connection can be considered in this context.

The screw-and-nut connection can, in particular, be designed in such a way that the nut is arranged with a shoulder in a through-hole in one of the handle sections in such a manner that it cannot be turned and that the end area of the shoulder protrudes into a through-hole in the other handle section to a depth which is less than the thickness of this handle section, and that this handle section is arranged so as to pivot around the end area of the shoulder of the nut.

In another preferred embodiment, conical through-holes, tapering towards the head of the screw and aligned with each other, are provided on the ends of the two handle sections of each scissor handle connected to each other in articulated fashion, where the nut, which is also of matching conical design, is located in the through-holes.

One or more circlips are expediently provided in order to prevent the nut and the handle sections from turning. An alternative, or supplementary safeguard against the nut turning can be achieved by an annular groove located in the inside of the nut, in which a circlip made of flexible material is likewise arranged to secure the screw.

The two ends of the two handle sections of each scissor handle, connected to each other in articulated fashion, can be designed as simple hinges. In order to increase the stability and the locking surface in the area of the pivot of the handle sections, a fork-shaped hinged joint is preferably used.

Instead of a screw-and-nut connection between the first and second handle sections of each scissor handle, a simple screw connection of the handle sections can also be expedient. In this case, the screw can extend through a bore in one of the two handle sections in rotating fashion and the threaded end of the screw can engage a threaded bore provided in the other handle section. By tightening the screw, the two handle sections are locked against each other in non-positive fashion.

A bolt can likewise be used to create a suitable hinged joint instead of a screw. In a preferred embodiment, the bolt extends through bores provided in the handle sections and the end opposite the head protrudes on the other side. The protruding end of the bolt is provided with a lever transverse to the longitudinal axis of the bolt with an eccentric cam-plate arranged on one or both sides of the bolt which applies pressure to the adjacent side of the handle section. By pivoting the lever, preferably into a position parallel to the two handle sections, the two handle sections are locked against each other in non-positive fashion between the eccentric cam-plate and the head of the bolt.

In order to better lock the two handle sections in the angle setting defined, it is expedient to at least partially provide circular knurls designed in complementary fashion to one another in the opposing areas extending around the bores for the screws or bolts on both handle sections.

In a further preferred embodiment of the invention, the ends of the two handle sections of each scissor handle, connected to each other in articulated fashion, display conical through-holes, tapering towards the ends and aligned with each other, which are at least partially provided with a knurl and through which an appropriately designed conical part with a complementary knurl protrudes, which is pretensioned with the help of a spring in the engaged position with the through-hole, and which can be released from this engaged position by pressure or traction.

To this end, the end of the conical part displaying the smaller cross-section can, in particular, display a thrust piece protruding on the corresponding handle section, and one end of the spring can be fixed to the thrust piece and the other end to the corresponding handle section.

The scissors according to the invention can extensively take the form of normal scissors. Thus, the two first handle sections, connected to the scissor blades, can be designed and arranged in such a way that the articulated joints between the two handle sections are located above one other when the scissors are closed. In this context, the parts provided in order to release the scissors from the locked position, i.e. the screws or nuts, are arranged on the outside of the scissor handles, so that they are accessible when the scissors are closed. On the other hand, the two first handle sections, connected to the scissor blades, can already be arranged at an angle to the scissor blades, so that the articulated joints between the handle sections are arranged next to each other when the scissors are closed.

Several practical examples of the invention are described in more detail below on the basis of the drawings. In this context, the drawings show the following:

DESCRIPTION OF THE PREFERRED EMBODIMENTS

Figure 1:
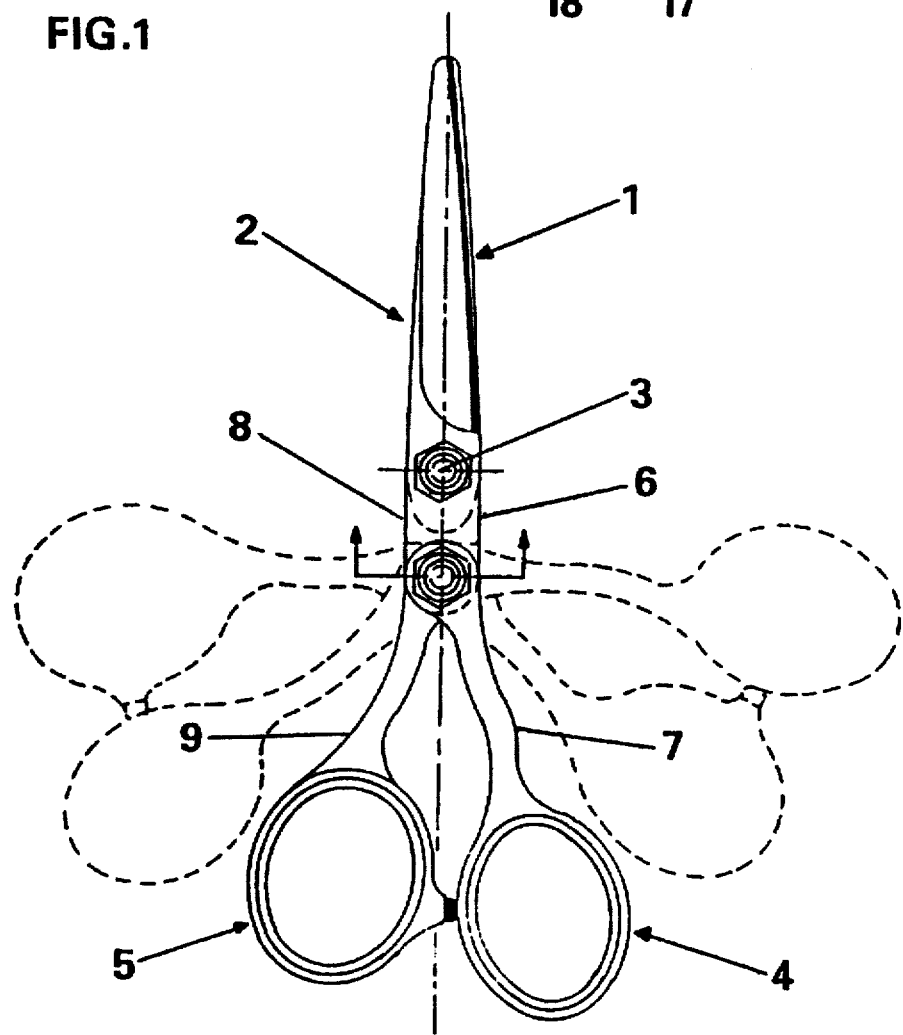
FIG. 1 A practical example with articulated joints between the first and second handle sections arranged above one another when the scissors are closed, FIG. 2 A section through the articulated joints arranged above one another according to FIG. 1, FIG. 3 A top plan view of the area of the articulated joint of the handle section located on the inside in FIG. 2, emphasising the circlip, in particular, FIG. 4 A second practical example with an interchangeable second handle section with finger hook drawn next to this drawing, FIG. 5 A third practical example, FIG. 6 An exploded view, partially in section, through the articulated joint between a first and second handle section of the scissors according to FIG. 5, FIG. 7 A top plan view of the two joint areas of the handle sections arranged next to each other according to FIG. 6, FIG. 8 A different embodiment of the articulated joint, partially in section, FIG. 9 A top plan view of the joint area of the handle section presented at the bottom of FIG. 8, FIG. 10 An alternative embodiment of the articulated joint between a first and second handle section, partially in section, FIG. 11 A section view of another embodiment of the articulated joint between a first and second handle section, FIG. 12 A top plan view of the articulated joint according to FIG. 11, FIG. 13 A partial section through the articulated joint of a fourth practical example, FIG. 14 A partial section through the articulated joint of a fifth practical example, and FIG. 15 A top plan view of the articulated joint presented in FIG. 14 with the thrust piece unscrewed.
Figure 3:
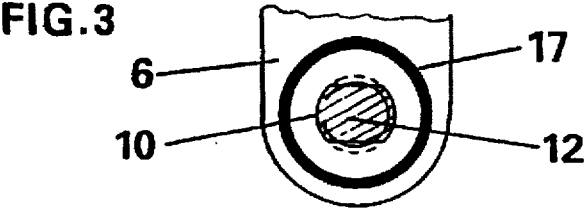

In FIG. 1, the two scissor blades of the scissors are designated 1 and 2, which are connected to each other in articulated fashion by a pivot 3 and which continue to form the scissor handles 4 and 5 beyond the pivot. Each scissor handle 4 or 5 comprises two handle sections 6 and 7 or 8 and 9, where the first handle section 6 or 8 is connected to the corresponding scissor blade 1 or 2 and the second handle section 7 or 9 includes the grip end of the handle section 4 or 5. The two handle sections 6 and 7 or 8 and 9 are connected to each other in articulated fashion in order to allow them to pivot in the handle plane and can be locked in place at various angles in relation to one another.

The articulated connection between the two handle sections 6 and 7 or 8 and 9 consists of a screw-and-nut connection in the practical examples presented in FIGS. 1 to 7.

Figure 2:
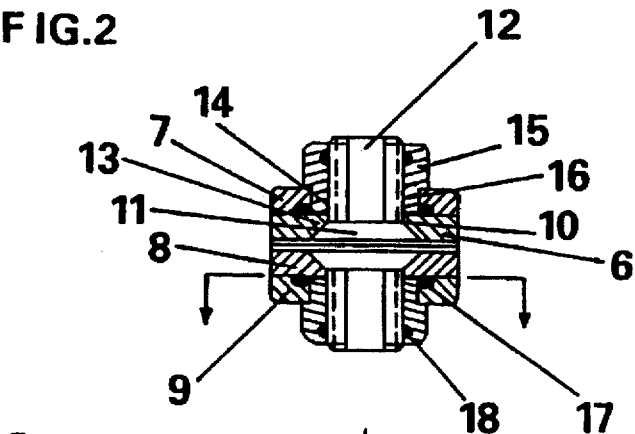

As can be seen more clearly in FIG. 2, the screw-and-nut connection of the scissors presented in FIG. 1 is made with a bore 10 provided in the handle section 6 or 8, which extends into a countersunk bore 13 in order to receive the head 11 of a countersunk screw 12, and a bore 14 with a larger radius in the other handle section 7 or 9, into which the nut 15 fits with a shoulder 16.

Circlips 17 and 18 are provided to prevent the nut 15 and the handle sections 6 and 7 or 8 and 9 from turning. Circlip 17 is arranged in an annular extension of the bore 14 in the second handle section 7 or 9 at the end facing towards the shoulder 16 of the nut 15. When the nut 15 is tightened, the circlip 17 applies pressure to the two handle sections 6 and 7 or 8 and 9, as well as to the nut 15 at the end of its shoulder 16. The second circlip 18 is located in an annular groove moulded on the inside of the nut 15, thus applying pressure to the nut 15 and the countersunk screw 12.

As can be seen from FIGS. 1 and 2, the two first handle sections 6 and 8 connected to the scissor blades 1 and 2 are shaped in such a way that they form an extension of the two scissor blades 1 and 2. Thus, when the scissors are closed, the articulated joints between the handle sections 6, 7 and 8, 9 are positioned above one another. By loosening the nuts 15 of the articulated joints, the second handle sections 7 and 9 can be pivoted to both sides in the plane of the handle in relation to the axis of the scissor blades 1 and 2. The second handle sections 7 and 9 can then be re-locked in place by tightening the nuts 15 once the most ergonomically favourable angular setting under the prevailing conditions has been reached.

As can be seen in FIG. 2, the heads 11 of the countersunk screws 12 are arranged opposite each other when the scissors are closed. The countersunk bores 13 correspond to the heads 11, so that the top sides of the countersunk screws 12 are aligned with the opposite sides of the handle sections 6 and 8. Smooth opposing surfaces are formed in this way.

Figure 4:
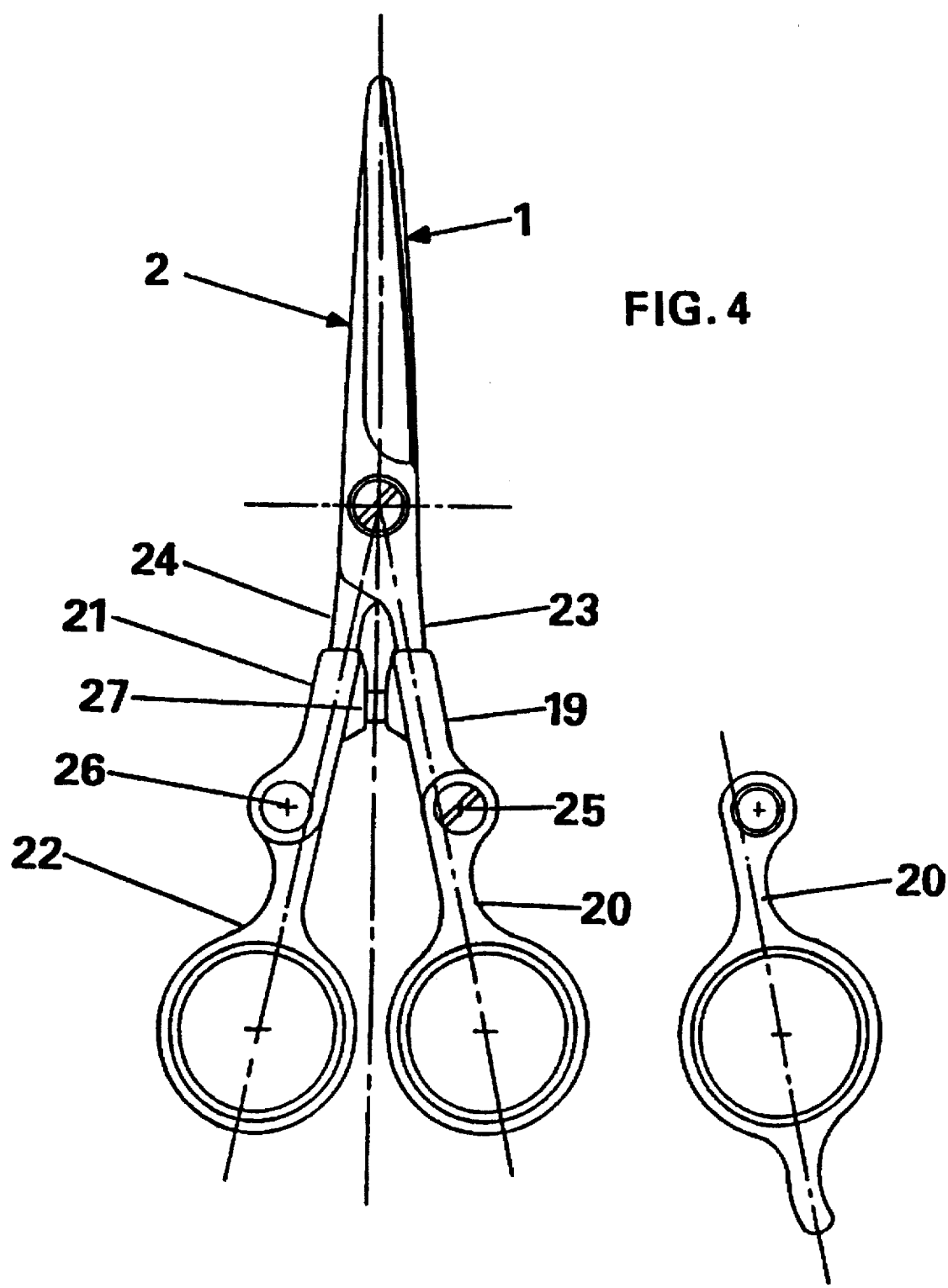
Figure 5:
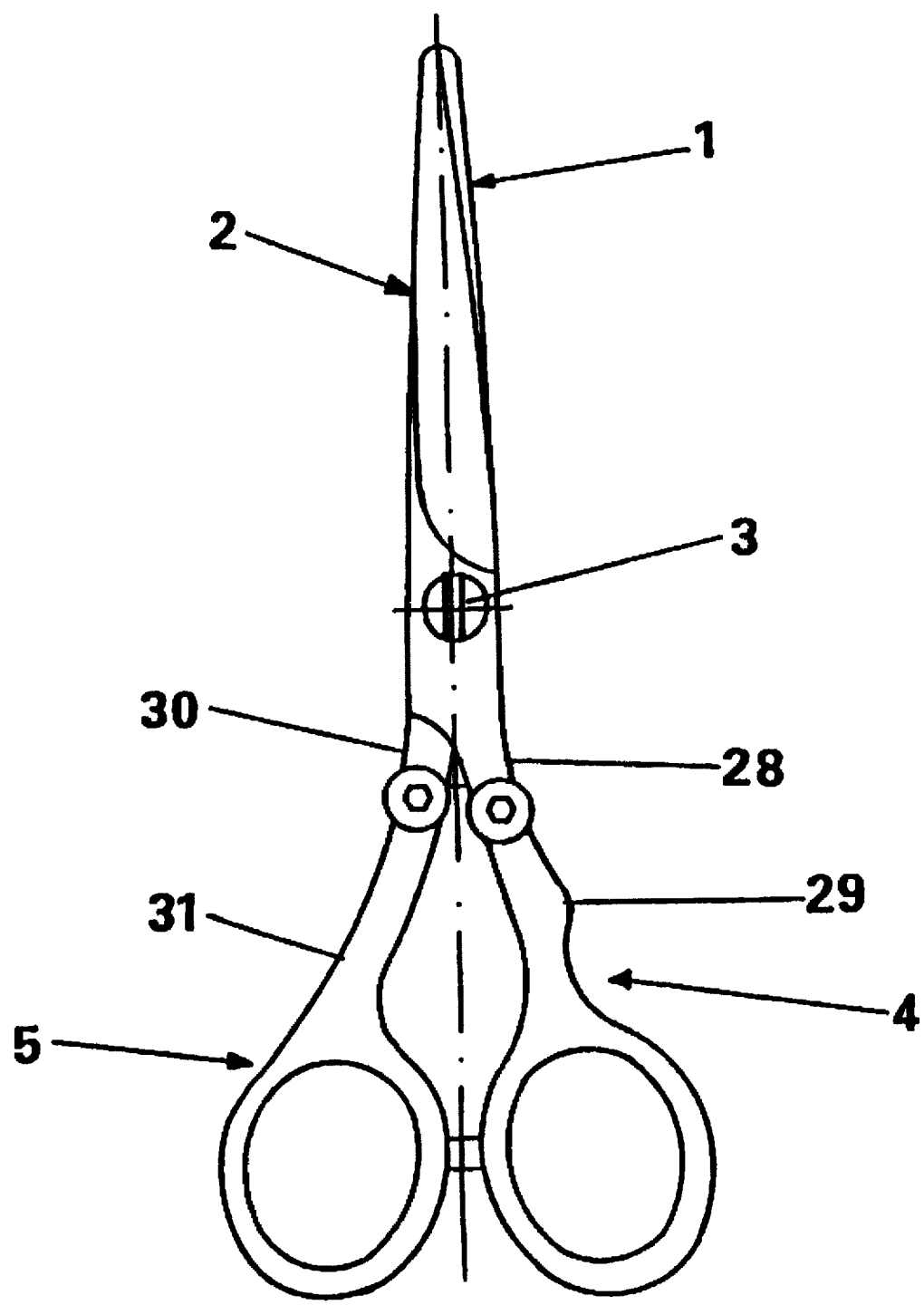

While the two first handle sections 6 and 8, which form an extension of the scissor blades 1 and 2, and the second handle sections 7 and 9 are made of steel in the case of the scissors presented in FIG. 1, the corresponding first and second handle sections 19, 21 and 20, 22 of the scissors presented in FIG. 4 are made of plastic. The first handle sections 19 and 21 are attached to extensions 23 and 24 of the scissor blades 1 and 2. The extensions 23 and 24 or the first handle sections 19 and 21 are arranged at an angle to the scissor blades 1 and 2, so that the hinged joints between the first and second handle sections 19, 20 and 21, 22 are located next to each other when the scissors are closed.

A screw-and-nut connection serves as the articulated joint between the first and second handle sections 19, 20 and 21, 22. By tightening the screws 25 on the nuts 26, the first and second handle sections 19, 20 and 21, 22 can be locked in place against each other.

Shoulders 27 are provided between the first handle sections 19 and 21, which prevent the tips of the scissor blades 1 and 2 from overlapping when the second handle sections 20 and 22 are being adjusted, thus eliminating the associated danger of injury.

The second handle section 20, designed to be used as a finger rest, can easily be replaced by another one on account of the detachable connection with the first handle section 19. The possibility thus exists of using a second handle section 20' provided with a finger hook, or a handle section with a narrower or wider grip loop for ergonomic reasons.

Figure 6:
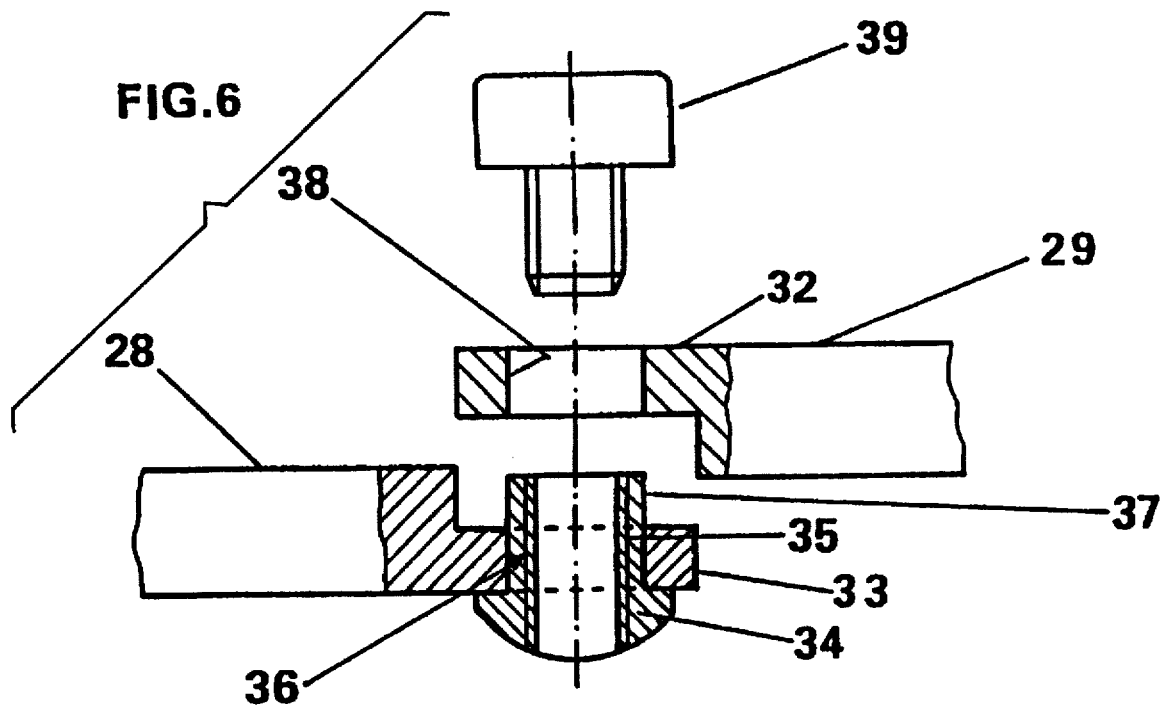

In contrast, the scissors presented in FIG. 5 again use first and second handle sections 28, 29 and 30, 31 made of steel, where the first handle sections 28 and 30 are designed to form an extension of the scissor blades 1 and 2. The articulated joints between the two handle sections 28, 29 and 30, 31 are shown in FIGS. 6 and 7.

The ends of the two handle sections 28 and 29 or 30 and 31, connected to each other in articulated fashion, display thinner areas 32 and 33, which are designed in a manner complementary to each other and form a simple hinge. The total thickness of the two handle sections 28 and 29 or 30 and 31 in the areas 32 and 33 corresponds to roughly the thickness of each handle section 28, 29, 30, 31 in the other areas, so that the adjacent side faces of the handle sections 28, 29 and 30, 31 are aligned with one another. The two handle sections 28 and 29 or 30 and 31 are connected to each other in an articulated and lockable fashion by means of a screw-and-nut connection.

The nut 34 is located with a shoulder 35 in a through-hole 36 in the handle section 28. The end area 37 of the shoulder 35 extends into a through-hole 38 in the handle section 29 over a depth which is less than the thickness of the area 32 of this handle section 29. The handle section 29 is arranged in such a way that it can be pivoted about the end area 37 of the shoulder 35 of the nut 34.

Figure 7:
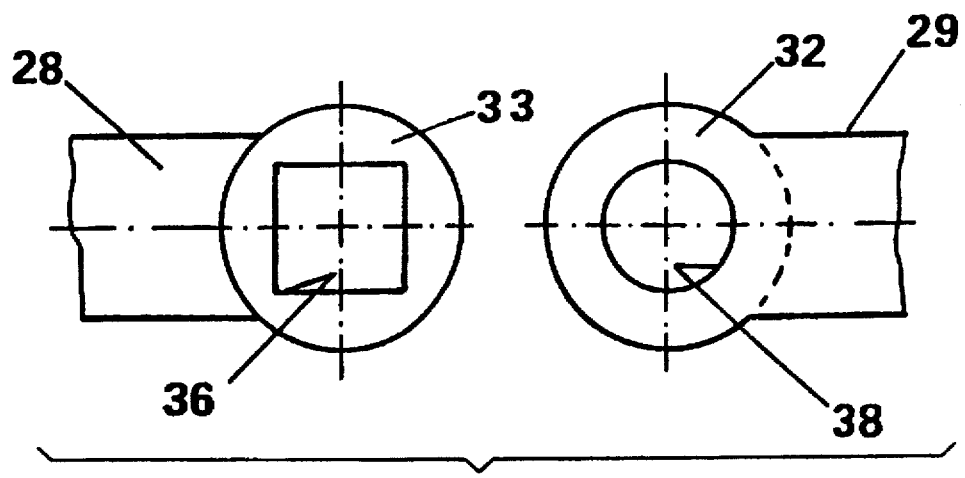

As can be seen from FIG. 7, the nut 34 is arranged in the through-hole 36 of the handle section 28 in non-rotating fashion in that the shoulder 35 of the nut 34 displays a square cross-section corresponding to the square cross-section of the through-hole 36 in the area of the through-hole 36. The areas 32 and 33 on the joint ends of the handle sections 29 and 28 are designed in circular form to accommodate the through-holes 38 and 36.

The two handle sections 28 and 29 are locked in the desired angular position by tightening the screw 39 in the non-rotating nut 34.

Figure 8:
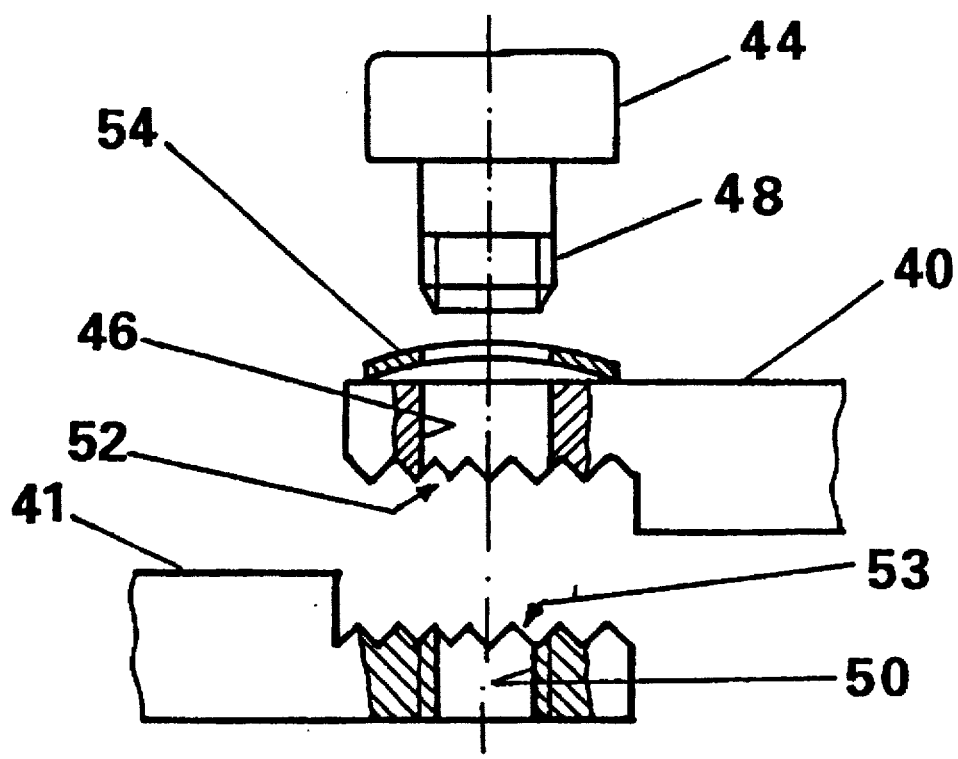
Figure 9:
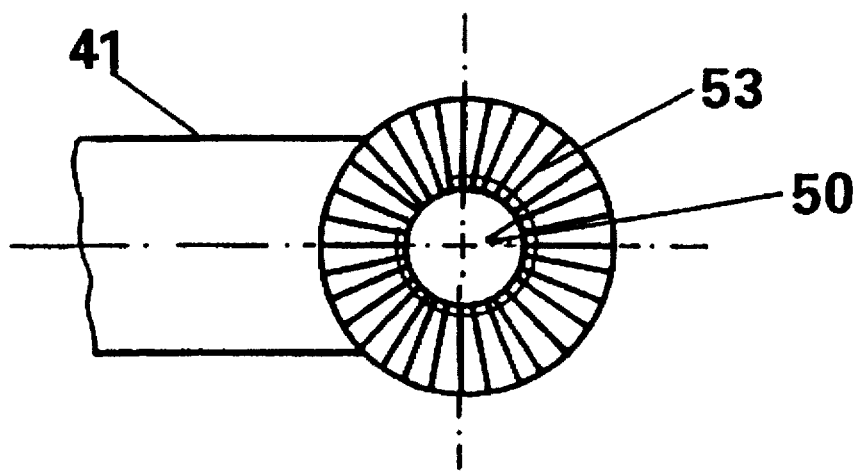
Figure 10:
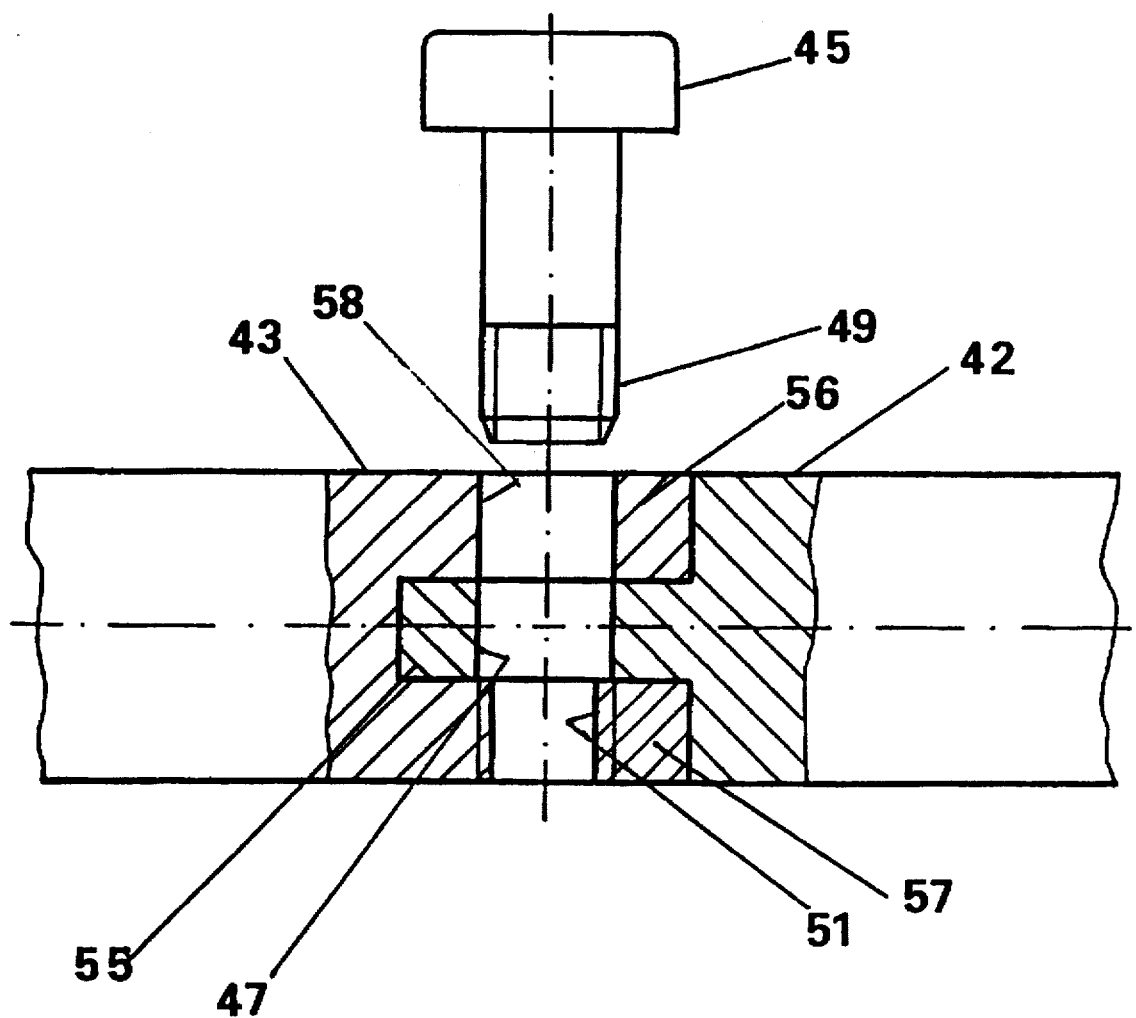

In the practical examples presented in FIGS. 8, 9 and 10, the two handle sections 40 and 41 or 42 and 43 are connected to each other by a screw 44 or 45, which protrudes through a bore 46 or 47 in the handle section 40 or 42 in rotating fashion and has a threaded end 48 or 49 which engages a threaded bore 50 or 51 provided in the other handle section 41 or 43. By tightening the screw 44 or 45, the two handle sections 40 and 41 or 42 and 43, arranged in pivotable fashion, can be locked in the desired angular position in relation to each other.

In the case of the practical example presented in FIGS. 8 and 9, the two opposing surfaces of the two handle sections 40 and 41 extending around the bores 46 and 50 display annular knurls 52 and 53 designed to complement one another. If these knurls 52 and 53 are engaged at the angular setting selected, the angular setting cannot change, even if great force is applied.

A spring washer 54, arranged between the screw head and the handle section 40, is envisaged as an additional safeguard against the screw 44 rotating.

Instead of the simple hinge presented in FIG. 8, hinges with interlocking parts can also be envisaged. FIG. 10 shows a fork-shaped hinge, where a thinner middle end section 55 of the handle section 42 extends between the end areas 56 and 57 of the handle section 43, arranged in fork-shaped manner. The screw 45 protrudes through a bore 58 in the end area 56 of the handle section 43 in rotating fashion, into the bore 47 of the handle section 42, its threaded end 49 then engaging the threaded bore 51 of the end area 57 of the handle section 43. By tightening the screw 45, the two handle sections 42 and 43 are locked in the selected angular setting in relation to each other.

Figure 11:
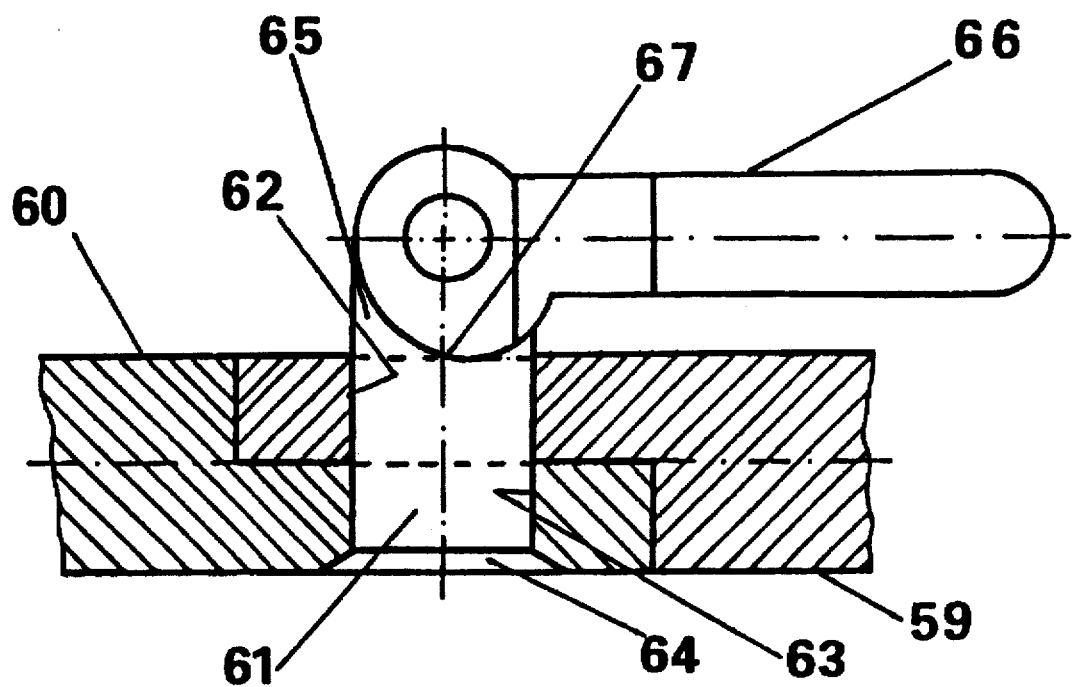
Figure 12:
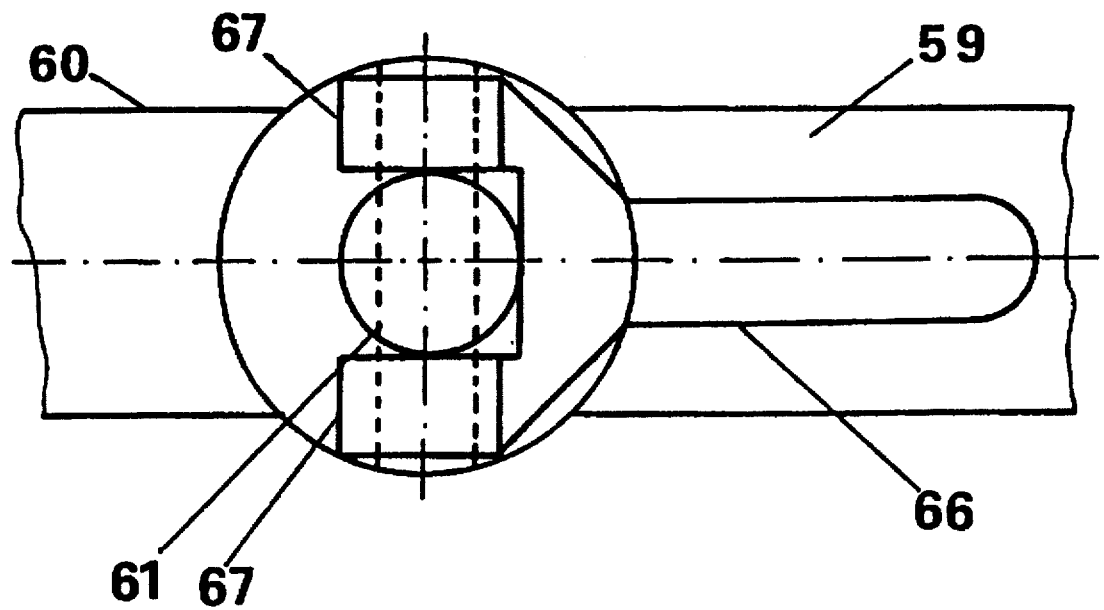

Finally, FIGS. 11 and 12 present a bolted connection between a first and second handle section 59 and 60. The bolt 61 extends through bores 62 and 63 in the handle sections 59 and 60, with the end 65 opposite its head 64 protruding. A lever 66 is located on the protruding end 65, transverse to the axis of the bolt, which displays eccentric cam-plates 67 on both sides of its pivoting axis, which exert pressure on the corresponding surface of the handle section 59. By pivoting the lever 66 into a position parallel to the handle sections 59 and 60, the two handle sections 59 and 60 are locked against each other in non-positive fashion, in the angular setting selected, between the head 64 of the bolt 61 and the eccentric cam-plates 67.

Figure 13:
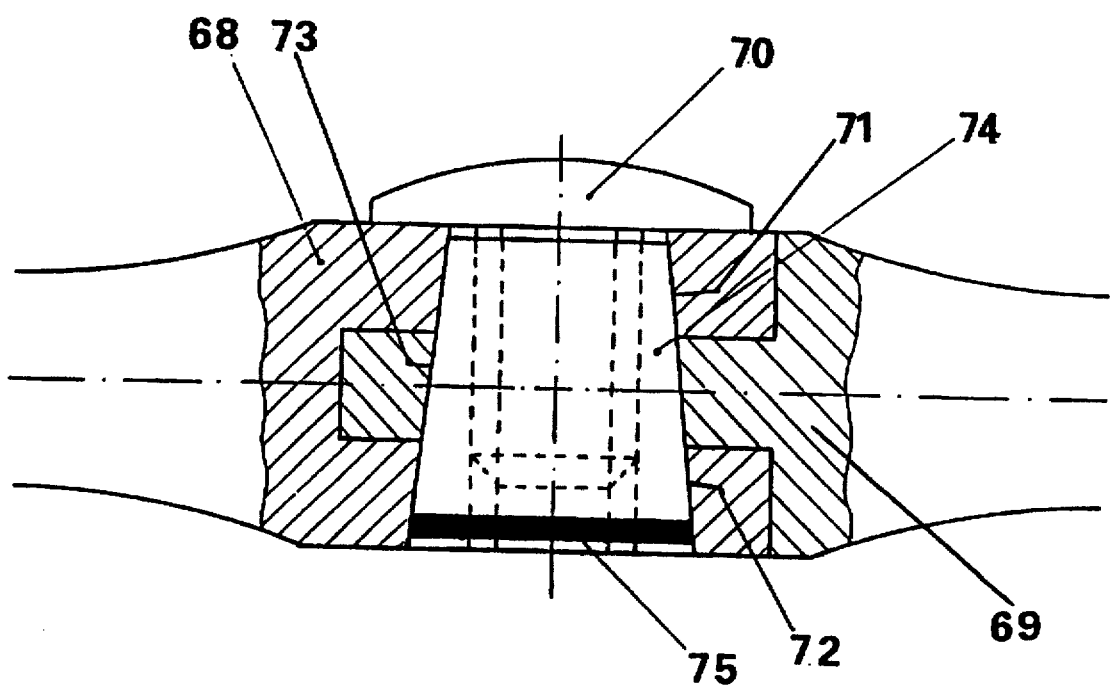

FIG. 13 shows a fourth practical example, in which the ends of the two handle sections 68 and 69 of each scissor handle 4, 5, connected by way of a fork joint, display conical through-holes 71, 72 and 73, which are tapered towards the screw head 70 and aligned with each other. The nut 74 is of a corresponding conical shape and arranged in the through-holes 71, 72 and 73 in such a way that tightening of the screw locks the two handle sections 68 and 69 against each other in non-positive fashion. To this end, the length of the conically shaped nut 74 is dimensioned in such a way that a sufficiently large gap is available between its face end, which has a smaller diameter, and the outer surface of the corresponding handle section 68, so that the nut 74 can be tightened in non-positive fashion via the screw.

A circlip 75 made of flexible material is provided between the conically shaped nut 74 and the fork-shaped end of the handle section 68 in order to prevent rotation.

In the practical example presented in FIGS. 14 and 15, the two handle sections 76 and 77 likewise display through-holes, aligned with each other and conically tapered, in their fork-shaped hinge area, which are provided with knurls 78 along a considerable part of their length. A correspondingly conical part 79 with a complementary knurl 80 protrudes through the knurled through-holes. The knurled part 79 is axially pretensioned in the engaged position with the through-holes with the help of a spring 81.

To this end, the end of the conically designed part 79 with the smaller diameter displays a thrust piece 82 in the form of a button, which protrudes from the corresponding handle section 76, where one end of the spring 81, designed as a pressure spring, is in contact with the inside of a head 83 located at the free end of the thrust piece 82, and the other end is connected to the outside of the corresponding handle section 76 in the edge zone of the through-hole.

The button-shaped thrust piece 82 is attached to the conically shaped part 79 by a screw connection.

By pushing the head 83 of the thrust piece 82, the conically shaped part 79 can be displaced from the engaged position with the hinge ends of handle sections 76 and 77, so that handle sections 76 and 77 can be pivoted relative to each other. By releasing the button-shaped thrust piece 82, the conically shaped part 79 is then pulled back into the engaged position with the hinge parts of the two handle sections 76 and 77 in the desired angular position, where the knurl 80 of the conically shaped part 79 interlocks with the knurl 78 of the through-hole in the hinge.

Although a preferred embodiment of the invention has been specifically illustrated and described herein, it is to be understood that minor variations may be made in the apparatus without departing from the spirit and scope of the invention, as defined the appended claims.

I claim:

1. Scissors comprising two scissor blades (1, 2), means (3) for connecting said scissor blades (12) to each other in articulated fashion, two scissor handles (4, 5) each of which includes two handle sections (6, 7; 8, 9; 19, 20; 21, 22; 28, 29; 30, 31; 40, 41; 42, 43; 59, 60; 68, 69; 76, 77), a first handle section (6; 8; 19; 21, 28; 30; 40; 42; 59; 68; 76) being connected to its corresponding scissor blade (1; 2) and a second handle section (7; 9; 20; 22; 29; 31; 41; 43; 60; 69; 77) including a grip end of the scissor handle (4; 5), the two corresponding handle sections (6, 7; 8, 9; 19, 20; 21, 22; 28, 29; 30, 31; 40, 41; 42, 43; 59, 60; 68, 69; 76, 77) being connected to each other in articulated fashion for pivoting in the plane of the handle, means (15, 17, 18; 25, 26; 34, 39; 44, 52, 53; 44, 45, 49, 51; 65, 66; 70, 71, 72; 79, 80) for locking the two handle sections (6, 7; 8, 9; 19, 20; 21, 22; 28, 29; 30, 31; 40, 41; 42, 43; 59, 60; 68, 69; 76, 77) at various angles in relation to each other at the articulated joint of the handle sections (6, 7; 8, 9; 19, 20; 21, 22; 28, 29; 30, 31; 40, 41; 42, 43; 59, 60; 68, 69; 76, 77).

2. Scissors as defined in claim 1 wherein said locking means comprises a screw-and-nut connection for connecting the two handle sections (6, 7; 8, 9; 19, 20; 21, 22; 28, 29; 30, 31; 68, 69) to each other and for locking the handle sections in relation to each other.

3. Scissors as defined in claim 2 wherein said screw-and-nut connection includes a nut (34) with a shoulder (35) arranged in non-rotating fashion in a through-hole (36) in one of the handle sections (28) and an end area (37) of the shoulder (35) extends into a through-hole (38) in the other handle section (29) to a depth smaller than the thickness of said other handle section (29), and said other handle section (29) is located in pivotable fashion about the end area (37) of the shoulder (35) of the nut (34).

4. Scissors as defined in claim 2 wherein the two handle sections (68, 69) of each scissor handle (4, 5) have mutually aligned conical through holes (71, 72, 73) tapering towards a screw head (70) of said screw-and-nut connection and a nut (74) of corresponding conical shape is located in said conical through-holes (71, 72, 73).

5. Scissors as defined in claim 4 wherein opposing surfaces of the two handle sections (40, 41) extending around bores (46, 50) in the handle sections and having at least partial annular knurls (52, 53) arranged in complementary fashion to one another.

6. Scissors as defined in claim 1 wherein the two handle sections (40, 41; 42, 43) are connected to each other by a screw (44; 45) of said locking means which extends through a bore (46; 47) in one of the two handle sections (40; 42) in rotating fashion and has a threaded end (48; 49) which engages a threaded bore (50; 51) of said locking means provided in the other handle section (41; 43) thereby locking the two handle sections (41, 41; 42, 43) in non-positive fashion.

7. Scissors as defined in claim 6 wherein opposing surfaces of the two handle sections (40, 41) extend around bores (46, 50) in the handle sections and having at least partial annular knurls (52, 53) arranged in complementary fashion to one another.

8. Scissors as defined in claim 1 wherein the two handle sections (59, 60) are connected to each other by a bolt (61) of said locking means which extends through bores (62, 63) in the handle sections (59, 60) and whose end (65) opposite a head (64) protrudes and locks the two handle sections (59, 60) in non-positive fashion with a lever (66) having an eccentric cam-plate (67) located on the protruding end (65) transverse to the longitudinal axis of the bolt (61).

9. Scissors as defined in claim 8 wherein opposing surfaces of the two handle sections (40, 41) extend around bores (46, 50) in the handle sections and having at least partial annular knurls (52, 53) arranged in complementary fashion to one another.

10. Scissors as defined in claim 1 wherein the two ends of the two handle sections (42, 43; 68, 69; 76, 77) of each scissor handle (4, 5) are in the form of a fork-shaped hinge.

11. Scissors as defined in claim 10 wherein opposing surfaces of the two handle sections (40, 41) extend around bores (46, 50) in the handle sections and having at least partial annular knurls (52, 53) arranged in complementary fashion to one another.

12. Scissors as defined in claim 1 wherein ends of the two handle sections (76, 77) of each scissor handle (4, 5) which are connected to each other and include conically tapered through-holes of said locking means aligned with each other and which have at least a partial knurl (78) and through which a conical part (79) with a complementary knurl (80) protrudes under pre-tension of a spring (81) in a locked position and which can be unlocked from the locked position.

13. Scissors as defined in claim 12, wherein an end of the conical part (79) with a smaller diameter carries a thrust piece (82) which protrudes from the corresponding handle section (76), and one end of the spring (81) is in contact with the thrust piece (82) and the other end of the spring (81) is connected to the corresponding handle section (76).

* * * * *